United States Patent
Tang et al.

(10) Patent No.: US 10,074,247 B1
(45) Date of Patent: Sep. 11, 2018

(54) PACKAGE OPENING DETECTION AND CONTROL

(71) Applicant: Amazon Technologies, Inc., Reno, NV (US)

(72) Inventors: Joshua K. Tang, San Luis Obispo, CA (US); Morgan P. Murphy, San Luis Obispo, CA (US); Travis J. McMillon, San Luis Obispo, CA (US); Dennis J. Taylor, San Luis Obispo, CA (US); Brett Taylor Armstrong, San Luis Obispo, CA (US); Kimberly Ann Knowles Nico, Morro Bay, CA (US); Kevin W. Watson, San Luis Obispo, CA (US); Tommy L. Bennett, San Luis Obispo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 912 days.

(21) Appl. No.: 13/633,691

(22) Filed: Oct. 2, 2012

(51) Int. Cl.
*G06Q 10/08* (2012.01)
*G08B 13/02* (2006.01)

(52) U.S. Cl.
CPC .......... *G08B 13/02* (2013.01); *G06Q 10/0832* (2013.01)

(58) Field of Classification Search
CPC ... G06Q 10/0832; G06Q 10/083; G06B 13/02
USPC ......................................................... 705/332
See application file for complete search history.

(56) References Cited

U.S. PATENT DOCUMENTS

| 4,688,244 | A  | * | 8/1987  | Hannon ................. G01C 21/22 235/375 |
| 6,211,907 | B1 | * | 4/2001  | Scaman .................. B60R 11/04 348/148 |
| 6,769,611 | B2 | * | 8/2004  | Miller et al. .................... 235/382 |
| 6,975,998 | B1 | * | 12/2005 | Jones ................. G06Q 10/0631 198/434 |
| 2004/0178880 | A1 | * | 9/2004  | Meyer ................. B60R 25/1004 340/5.22 |
| 2004/0246130 | A1 | * | 12/2004 | Lambright ............. G06Q 10/08 340/539.26 |
| 2005/0225445 | A1 | * | 10/2005 | Petersen et al. ........... 340/568.2 |

(Continued)

FOREIGN PATENT DOCUMENTS

WO     WO 99/35357     *  7/1999 ............ E05B 43/00

OTHER PUBLICATIONS

Schoeneman et la., Authenticated Tracking and Mointoring System (ATMS) Tracking Shipments from an Australian Uranium Mine, Security Technology, 1997. Proceedings. The Institute of Electrical and Electronics Engineers 31st Annual 1997 International Carnahan Conference on, pp. 231-240 (Year: 1997).*

*Primary Examiner* — Michael P Harrington
*Assistant Examiner* — Rupangini Singh
(74) *Attorney, Agent, or Firm* — Eversheds Sutherland (US) LLP

(57) ABSTRACT

A package may have a sensor that detects the opening of the package. Upon detecting the opening of the package, a device associated with the sensor transmits a signal to a web server. The web server may take various actions in response to the receipt of the signal. In addition, a package may have a lock that prevents the package from readily being opened until a preset time. In addition, the package may be equipped with a device capable of automatically opening the cover of the package upon being unlocked.

17 Claims, 10 Drawing Sheets

(56) References Cited

U.S. PATENT DOCUMENTS

2006/0224355 A1* 10/2006 Morrison et al. ............. 702/173
2009/0309722 A1* 12/2009 Nichols et al. ............... 340/541
2011/0012731 A1* 1/2011 Stevens ................. G01S 5/0027
                                                                             340/539.31

* cited by examiner

PACKAGE OPENING DETECTION AND CONTROL

BACKGROUND

Packages are routinely shipped and delivered to designated addressees. A sender, however, is not able to prevent or control the opening of the package, for example, prior to a certain date or time, such as a birthday or holiday. In fact, after the delivery of a package to the addressed location, the sender and shipper do not know if or when the package is opened, nor do they have any control over the opening of the package.

BRIEF DESCRIPTION OF THE DRAWINGS

The detailed description is set forth with reference to the accompanying drawings. Various embodiments may utilize elements and/or components other than those illustrated in the drawings and some elements and/or components may not be present in various embodiments. Throughout this disclosure, depending on the context, singular and plural terminology may be used interchangeably.

Figure 1:
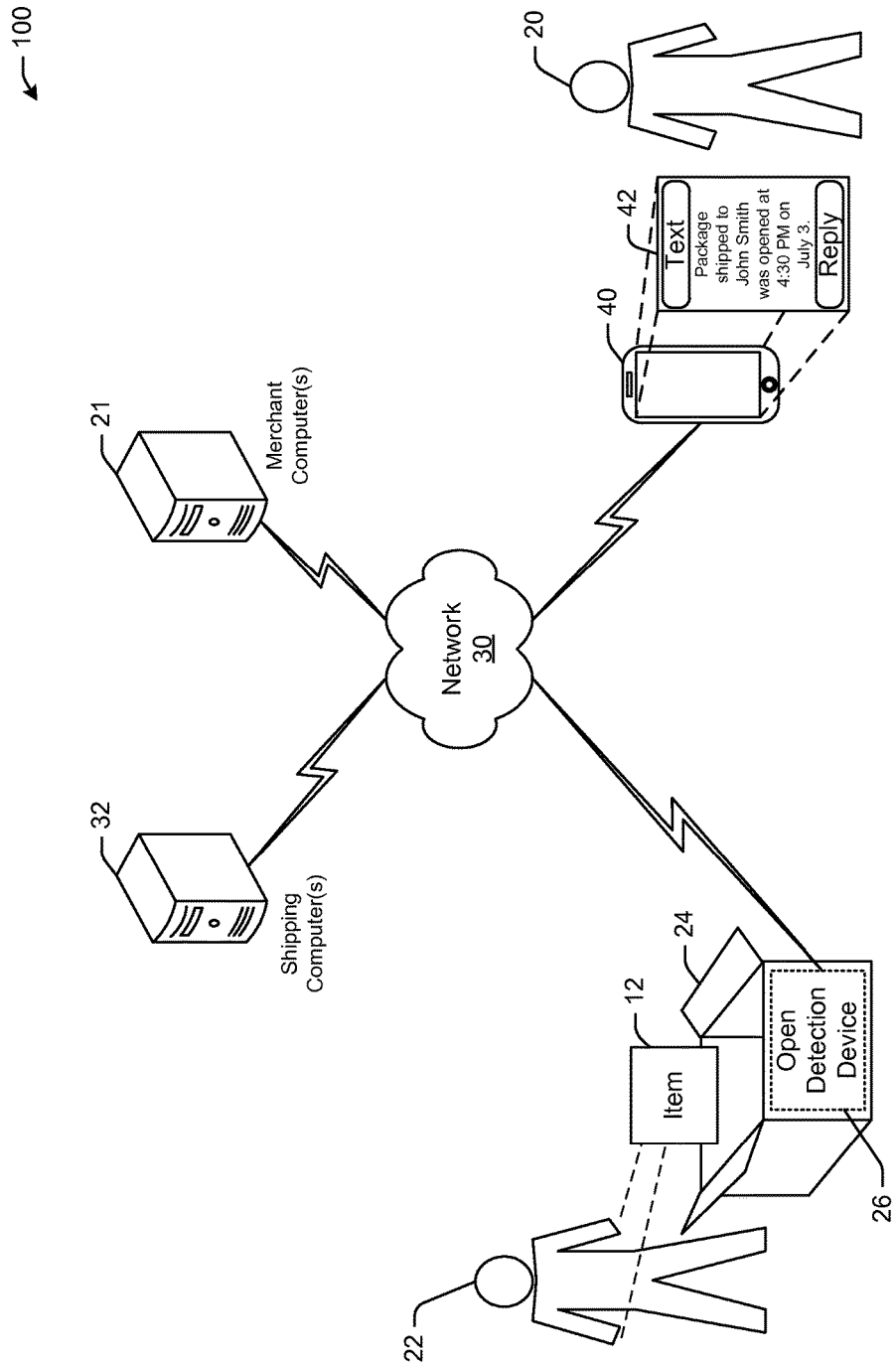
FIG. 1 illustrates an example system for sending information associated with the opening of a package, in accordance with an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

Packages are routinely shipped and delivered to addresses. A vendor or sender may desire to know if or when the shipped package is actually opened. Data pertaining to customer behavior patterns associated with the receipt and opening of shipped packages may be valuable information to a vendor, such as a merchant or shipper. For example, if a package is immediately opened, a vendor may wish to provide the recipient with the opportunity to purchase associated products. A longer delay time in opening the package may indicate a lesser interest by the recipient. Additionally, the time a package is opened may be useful to the vendor in connection with fraud detection. If a package is opened prior to delivery to its final destination, the detection of its opening may trigger immediate investigation of possible fraud. Naturally, the sender of the package also may wish to know when a package is actually opened. Numerous other business purposes may be associated with additional knowledge of pertaining to the end of the life cycle of an ordered item.

In addition to knowing when a package was opened, a sender may wish for a package not to be opened prior to a certain date or time. In other situations, the sender may wish the package to open automatically, such as in association with a specific celebration (e.g., during a birthday party) or in association with a holiday (e.g., before the recipient wakes up on a holiday morning).

In an embodiment of the disclosure, the opening of a package may be detected and notification of the opening transmitted to the vendor, such as a merchant and/or shipper. A server associated with the vendor receives the notification and programmed modules may take various actions based at least in part on the notification information. For example, the vendor may notify the sender that the package has been opened, such as by a text message, e-mail, etc.

In another embodiment of the disclosure, a timed locking mechanism may be attached to a package to deter or prevent the package from being opened until a preset time or event. After the preset time or event, the package may be unlocked and easily opened. In one aspect, the package may have an indicator to inform the recipient as to when the package may be opened.

In yet another embodiment, a package may be equipped to automatically open itself. The automatic opening of the package may occur at a preset time or in response to a signal or event.

In the following description, numerous specific details are set forth. However, it is understood that embodiments of the disclosure may be practiced without certain elements of these specific details or in various combinations of these specific details. In other instances, well-known methods, structures, and techniques have not been shown in detail in order not to obscure an understanding of this description. References to "one embodiment," "an embodiment," "example embodiment," "various embodiments," etc., indicate that the embodiment(s) of the disclosure so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

As used herein, the term package may refer generally to a box, container, envelope, carton, crate, basket, shipping devices made of, for example, corrugated cardboard, plastic, metal or any other suitable material for shipping, or may include any other suitable structure or device designed for shipping.

Described in this disclosure are illustrative systems and methods for detecting and transmitting the actual time a package is opened, ensuring a package cannot be opened prior to a preset time, automatically opening a package, and associated data processing.

Illustrative Embodiments

FIG. 1 illustrates an example embodiment 100 for sending information associated with the opening of a package 24 in accordance with an embodiment of the disclosure. Items 12 are routinely shipped to individuals or entities from other individuals or entities. For example, a person may purchase an item online or from a merchant not in proximity to the shipping address to which the item is to be delivered. In an illustrative example, a purchaser 20 may purchase an item 12 from an online merchant associated with the merchant computer(s) 21. Alternatively, the purchaser 20 may purchase the item 12 over the phone, in a store, or any other suitable method, and may request the item 12 be shipped to a recipient 22. In some embodiments, the purchaser and the recipient may be the same person, as may be desired for fraud or theft detection.

In the example where item 12 is purchased online from a merchant, the merchant or third party service provider may pack the item 12 in a shipping container or package 24 for safe delivery, and provide the package 24 to a shipper for delivery to a destination address. Alternatively, the shipper may pack item 12 in the package 24. The shipper may be the vendor, a delivery service, or any other service provider that ships or facilitates the shipping of packages to the destination addresses, such as the United States Postal Service.

In an illustrative embodiment, an open detection device 26 may be included with the package 24 in such a manner to detect the opening of the package 24 and to transmit a message to the merchant (and/or shipper), such as the merchant computer(s) 21, that the package 24 has been opened. The open detection device 26 may be configured with the package 24 in any number of suitable ways, such as but not limited to being integrated into the package 24, mounted to a surface of the package 24, placed in the package 24, or attached to item 12 inside the package 24. The package 24 further may be designed in such a way as to be easily folded or collapsed, and returned to the shipper for re-use in whole or in part. Alternatively, the open detection device 26 may be configured to be removed from the package 24 and shipped back to the merchant (or shipper). In certain embodiments, the merchant may offer the recipient 22 incentives to return the package 24 and/or the open detection device 26 for reuse.

The package 24 may be delivered to the destination address, that is, the final destination by the shipper. The recipient 22 at the destination address may then open the package 24 to gain access to the shipped item 12, and upon opening the package 24, the open detection device 26 may detect or sense the opening of the package. For example, the open detection device 26 may include a photosensor and associated processor, and upon the photosensor detecting light, for instance, light of a preset intensity for a preset period of time, the open detection device 26 may transmit a signal to, for example, the merchant computer(s) 21.

In certain embodiments, in addition to detecting the opening of the package 24, the open detection device 26 may collect information local to the package 24, such as the time, location, video, audio or other information, such as may be associated with the recipient opening the package 24 to access item 12. Such local information collected by the open detection device may generally be referred to as contextual data.

The signal may include certain information, such as a time stamp, information identifying the package 24 and/or item 12, shipper information, sender information, purchaser information, recipient information, destination address information, etc., as well as captured data such as one or more photos, video files, or audio files. The signal may be formatted in any suitable format, and in certain embodiments may be compressed or encrypted, as desired.

In one embodiment, the open package signal may be transmitted to the merchant computer(s) 21 via one or more networks 30. The network(s) 30 may include, but are not limited to, any one or a combination of different types of suitable communications networks, such as cable networks, the Internet, wireless networks, cellular networks, or any other private and/or public networks. Further, the network(s) 30 may include any type of medium over which network traffic may be carried including, but not limited to, coaxial cable, twisted wire pair, optical fiber, hybrid fiber coaxial (HFC), microwave terrestrial transceivers, radio frequency communications, satellite communications, or combinations thereof.

In some embodiments, the open package signal may be communicated via network 30 to a third party packager, shipper, or any other entity associated with the packaging and/or shipping of the package 24. For example, the shipper computer(s) 32 associated with a third party shipping service that participates in the delivery of the package 24 to the recipient 22 may receive the open package signal, process same, and then provide notification that the package has been opened to one or more of the merchant computer(s) 21, the purchaser user device 40, or a recipient user device.

In the illustrative embodiment, upon receipt of the open package signal, the merchant computer(s) 21 may be configured to take action. In one embodiment, one or more software modules may provide notification of the package being opened to a user device 40 associated with the purchaser 20. In an embodiment, the notification may be transmitted via the network 30 in the form of an electronic mail, text message, voice message, etc., as may be requested or predetermined by the purchaser 20. For instance, the purchaser 20 may receive a text message on their user device 40 stating that the package 24 has been opened, as may be presented to the purchaser 20 via a display device 42 associated with the user device 40. Included in the message may be additional information, such as the time the package 24 was opened, as well as other local information (e.g., contextual data) captured in connection with the opening of the package 24, such as photos, video, audio, location, etc. In certain embodiments, depending on the means utilized for notifying the purchaser, the contextual data may be sent separately and/or downloaded by the purchaser 20 at a time separate from the receipt of the open package notification.

Other embodiments, various modules associated with the merchant computer(s) 21 may be utilized to process the open package signal for theft detection, increased business opportunities, modeling consumer behavior, and other business purposes, as discussed in greater detail below.

The system 100 described above with reference to FIG. 1 is provided by way of example only. As desired, a wide variety of other methods, systems, and embodiments may be utilized to detect the opening of a package, to transmit a signal associated with the detection, and to process the signal for purposes of notification, fraud detection/prevention, and business applications. These embodiments may include different technologies, users, and methodologies than those illustrated in FIG. 1.

Figure 2:
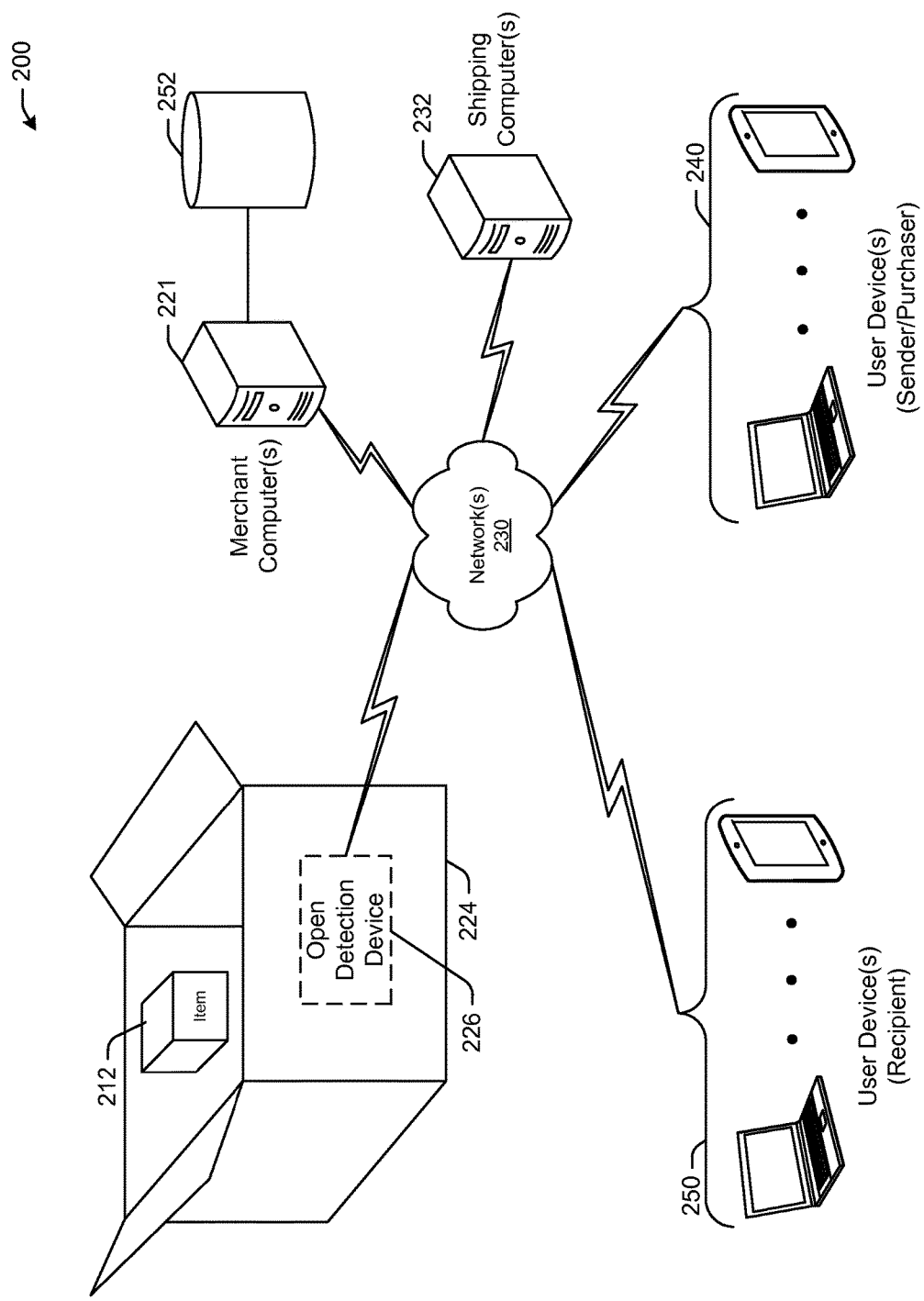
FIG. 2 illustrates another example system for sending information associated with the opening of a package, in accordance with an embodiment of the disclosure.

FIG. 2 illustrates another example embodiment 200 for sending information associated with the opening of a package 224 that may assist in detecting possible fraud or theft, in accordance with an embodiment of the disclosure.

In the shipment of a package 224 that includes an open detection device 226, the device 226 may detect the opening of the package 224 prior to the delivery date. This may be indicative of an attempted theft of an item 212 contained in the package 224, it may be indicative of damage to the package 224, or it may simply reflect an earlier than expected delivery of the package 224. In any case, the open detection device 226, upon the detection of the package being opened, may communicate an open package signal to a merchant computer(s) 221, similar to the manner discussed above.

The merchant computer(s) 221 may be in communication with a shipping computer(s) 232, which may be associated with a shipping entity that shipped or facilitated the shipping of the package 224 to the destination address, and the user device(s) 240 of the sender/purchaser, and the user device 250 of the recipient, which may be associated with the destination address, via one or more networks 230. The merchant computer(s) may receive and store, for each item shipped certain shipping information from the shipping computer 232, such as pick up time, current status, last location, expected delivery time, delivery confirmation (e.g., signature of recipient at destination address). Such information received from the shipping computer(s) 232, as well as information accessible by the merchant computer(s) 221 and relating to the item 212 shipped, such as SKU number, date sold, purchaser information, price information, shipping information (e.g., cost, shipping entity, dated picked up, destination address, etc.), may be stored in a datastore(s) 252, and may be generally referred as package data. The datastore(s) 252 may be internal data storage devices of the merchant computer(s) 221 and/or external data storage devices.

In the present example, the received open package signal may include information, such as the time the package 224 was opened. This information may be compared or otherwise analyzed in light of the shipping information stored in the databases(s) 252 and associated with the package 224, such as the expected delivery date, to determine if there may be theft or fraud associated with the opening of the package 224. For example, if the open package signal indicates the package was opened on the second day of a month, but the expected delivery date was the 5$^{th}$ day of that month, then there may be a high likelihood the package was opened fraudulently or in connection with an act of theft. Based on the comparison of the time opened to the expected delivery time, and perhaps other factors such as whether the package has been noted as delivered, whether delivery was confirmed, last known location and time, etc., a determination can be made as to the likelihood of fraud or theft. Other information available to the merchant computer(s) 221, such as content that may be captured by the open detection device 226, may be utilized. For instance, if the open detection device 226 includes a camera the photos or videos may be captured by the open detection device 226 and sent to the merchant computer(s) 221. In addition, if the open detection device 226 includes a location device, such as a GPS receiver, then location information associated with the location where the package is opened and/or the route the package traveled since leaving control of the merchant may be captured by the open detection device 226 and sent to the merchant computer(s) 221.

If it is determined that the opening is likely to be fraud or theft, then the merchant computer(s) 221 may initiate appropriate action, which may include a determination of common facts with other cases of fraud/theft to identify problematic locations, shippers, etc. A relatively rapid determination that the receipt of the open package signal may be associated with fraud or theft may increase the probability of favorably resolving the suspected fraud or theft. The merchant computer(s) 221 also may notify (or prompt notification) of others, such as the sender/purchaser and/or the recipient, such as by respective user devices 240, 250. Other action may include the prompt shipment of a replacement item 212 to the recipient, such as on a priority basis.

In yet another embodiment, with continued reference to FIG. 2, if the open detection device 226 associated with the package 224 does not communicate an opened package signal within a predetermined time after the expected delivery date, then the merchant computer(s) 221 may initiate an inquiry process. This process may be intended to notify or remind the sender/purchaser and/or recipient that the package 224 has been delivered but not opened. It may be that the recipient purposefully has not opened the package, or it might be that the package was opened and the open detection device 226 did not send an opened package signal, or that there was a communication failure if one was sent. Such notice may be sent in a manner that enables the recipient and/or sender to respond with information pertaining to the package, such as indicating the package has been opened or has not been delivered. In certain embodiments where the packages 224 or the open detection devices 226 are returned to the merchant or shipper, then information relating to the returned package 224 and/or open detection device 226 may be useful in determining why an opened package signal was not received by the merchant computer(s) 221. This may entail the merchant computer(s) 221 periodically checking the status of packages in the process of being shipped and/or following delivery. Those skilled in the arts will recognize that the merchant computer(s) 221 may take numerous other actions in response to the receipt of the package open.

While the above examples reference the expected delivery date and the actual delivery date, it will be appreciated that any preset or predetermined time may be utilized, and that the above examples are mere illustrations of one embodiment.

The system 200 described above with reference to FIG. 2 is provided by way of example only. As desired, a wide variety of other methods, systems, and embodiments may be utilized to detect possible fraud or theft associated with the opening of a package. These embodiments may include different technologies, users, and methodologies than that illustrated in FIG. 2.

Figure 3:
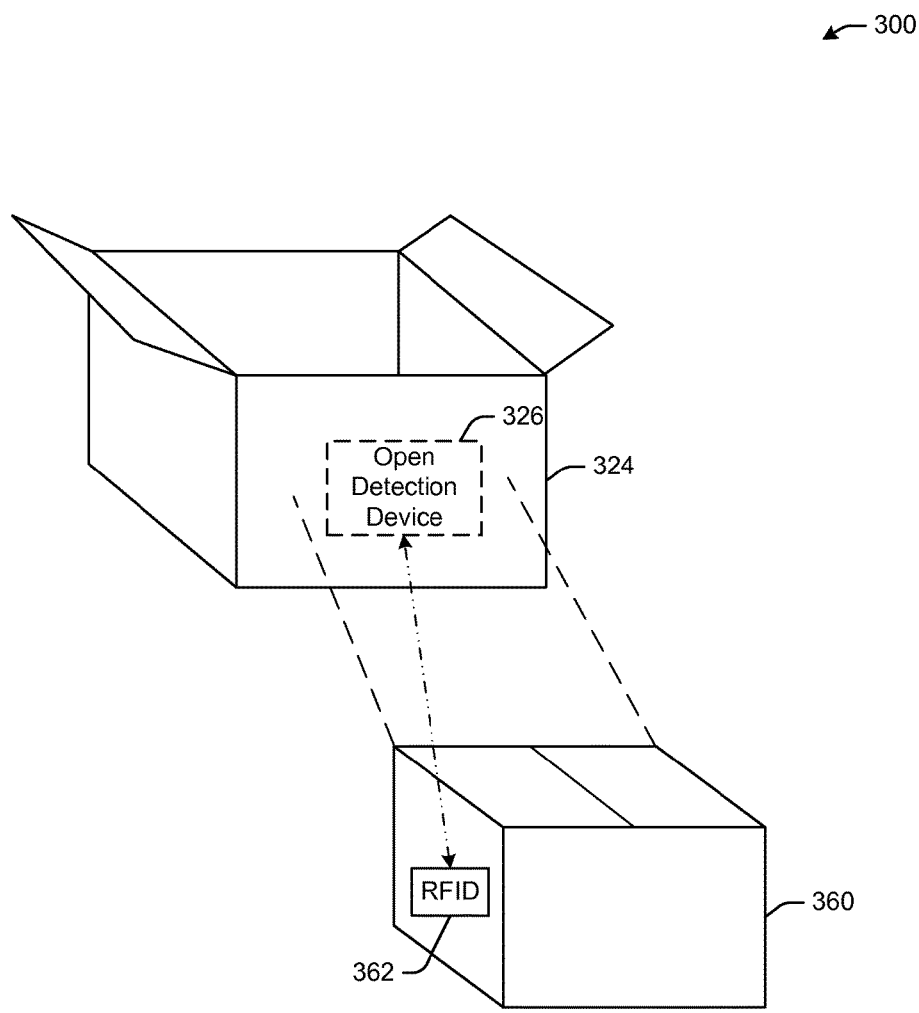
FIG. 3 illustrates an example shipping package that has additional packages inside with open detection systems, in accordance with an embodiment of the disclosure.

FIG. 3 provides an example embodiment of a shipping package 324 that has one or more additional packages or items 360 enclosed inside the shipping package 324. An open detection device 326, in accordance with an embodiment of the disclosure, may also be associated with the shipping package. In this embodiment, the open detection device 326 may be operable to detect the opening of the shipping package 324, similar to the embodiments discussed above. In addition, or in the alternative, the open detection device 326 may detect when the one or more additional items 360 is removed from the package 324, and in such circumstances communicate a signal indicative of such, such as to a shipping entity, merchant, sender, etc. For example, the one or more additional items 360 may each be associated with respective radio frequency identification ("RFID") tags 362. The open detection device 326 may be operable to detect a loss of the signal generated by one of the RFID tags 362 in response to an interrogation signal from the open detection device 326, thereby indicating that the associated additional item has been removed from the package 324, that is, moved a sufficient distance from the opened detection device 326 so that the devices can no longer communicate with one another. In this illustrative embodiment, when more than one additional items 360 are shipped in the package 324, the removal of each additional item 360 from the package may be separately detected and may result in the communication of individual signals indicative of such to the shipping entity, merchant, sender, etc.

Figure 4A:
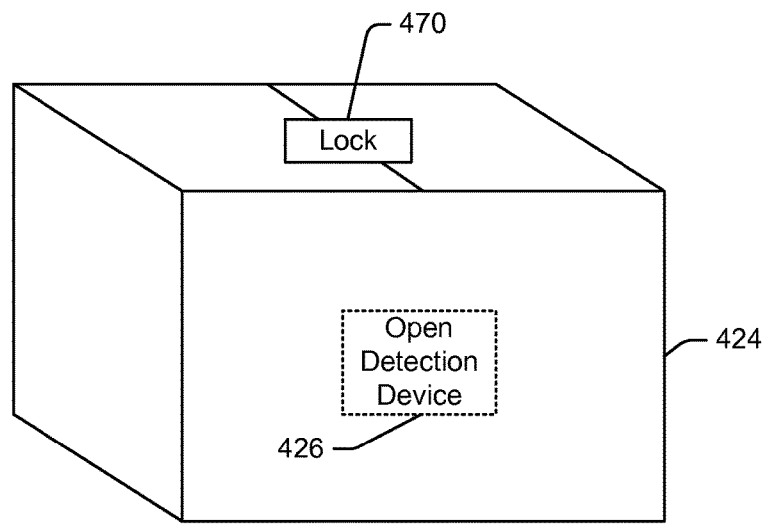
FIGS. 4A and 4B illustrate an example block diagram of the open detection device including sensors and transceivers, in accordance with an embodiment of the disclosure.
Figure 4B:
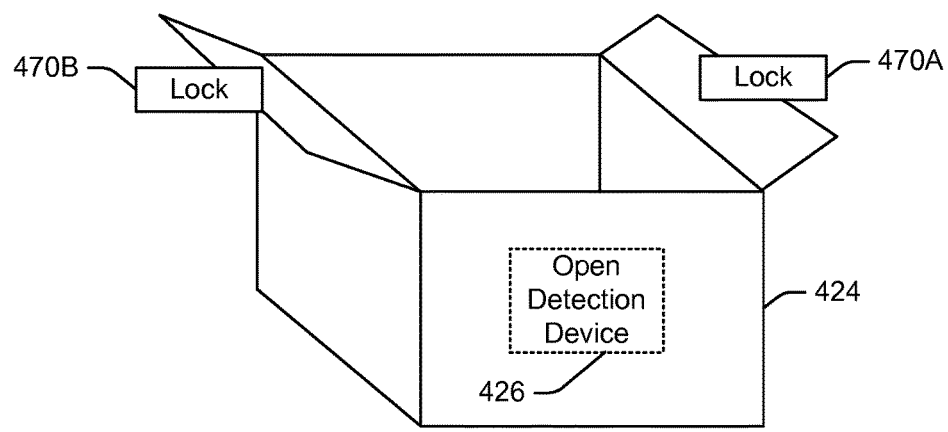

FIGS. 4A and 4B provide an example embodiment of a package 424 that includes an open detection device 426, which may operate in a similar fashion to the open detection devices discussed above. In addition, the package 424 may include a time lock 470 for locking (e.g., preventing or resisting the opening of) the package 424 until a preset time. That is, the time lock 470 may prevent or resist the package 424 from readily being opened until a preset time. The time lock 470 may comprise, for example, an electronically activated locking mechanism 470A and a lock receiving mechanism 470B, as illustrated in FIG. 4B. The operation of the time lock may be controlled by the open detection device 426, and/or, the time lock 470 may be in communication with the open detection device 426 so that the open detection device knows when the time lock has been unlocked. In response to the unlocking of the time lock 470, the open detection device 426 may communicate a signal indicative of such to a shipping entity, merchant, sender, etc. This communication may be independent of or in conjunction with a communication of a package opened signal communicated by the open detection device 426.

In one embodiment, as instructed in FIG. 4B, locking mechanism 470A may be an electronically activated latch and a receiving mechanism 470B may be a corresponding latch receiving member. At the preset time, the locking mechanism 470A automatically actuates and unlatches from the latch receiving mechanism 470B, thereby enabling the package 424 to be easily opened. In another embodiment, the locking mechanism 470A may be an electromagnetic lock and the receiving mechanism 470B may be an armature plate. At the preset time, a current supplied from a battery, which may be integrated into the open detection device 426, may be removed from the electromagnet enabling the package 424 to be easily opened. Those skilled in the art will readily recognize numerous other methods to automatically unlock a cover of package 424 when a preset time has occurred.

Figure 5:
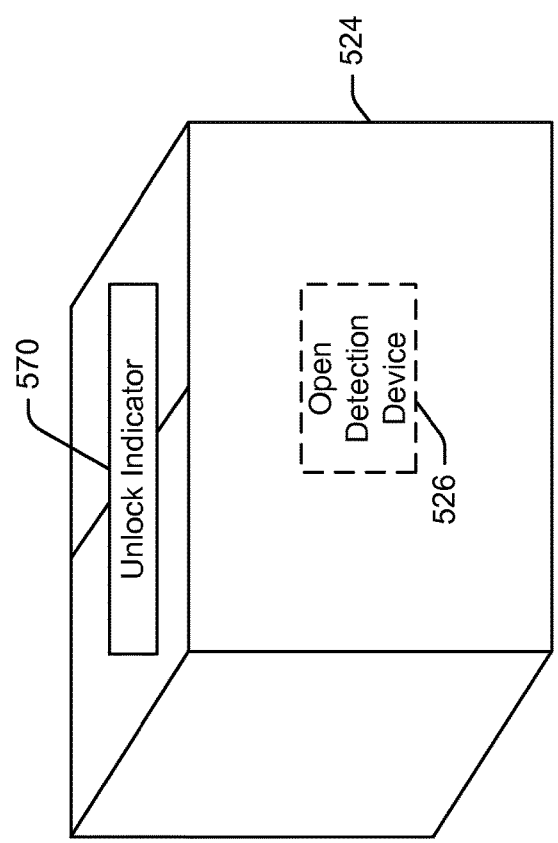
FIG. 5 illustrates an example system for locking a package until a preset time.

FIG. 5 provides an example embodiment of a package 524, which may be similar to that described above in connection to FIGS. 4A and 4B, and further including an unlock indicator 570 providing an indication of when a package 524 is enabled to be opened, in accordance with an embodiment of the disclosure. In this embodiment, the package 524 has an indicator 570 indicating the status of the package 524, that is, whether it is located or unlocked, or when the package 524 will be unlocked. The indicator 570 may be in communication with an open detection device 526. The indicator 570 may include a display that is configured to display, for example, a color that may be coded to indicate the preset time has lapsed and the packaged is now unlocked. For example, a red display may indicate that the preset time has not yet occurred and a green display may indicate that the package 524 is now unlocked and able to be opened. The indicator 570 also may be configured with a display that presents a countdown of time to the preset time. In certain embodiments, the indicator may be integrated with a locking mechanism. Those skilled in the art will recognize that numerous other displays or indicators may be utilized as indicator 570 to indicate the status of the package 524 and/or to convey a message to the recipient.

Figure 6:
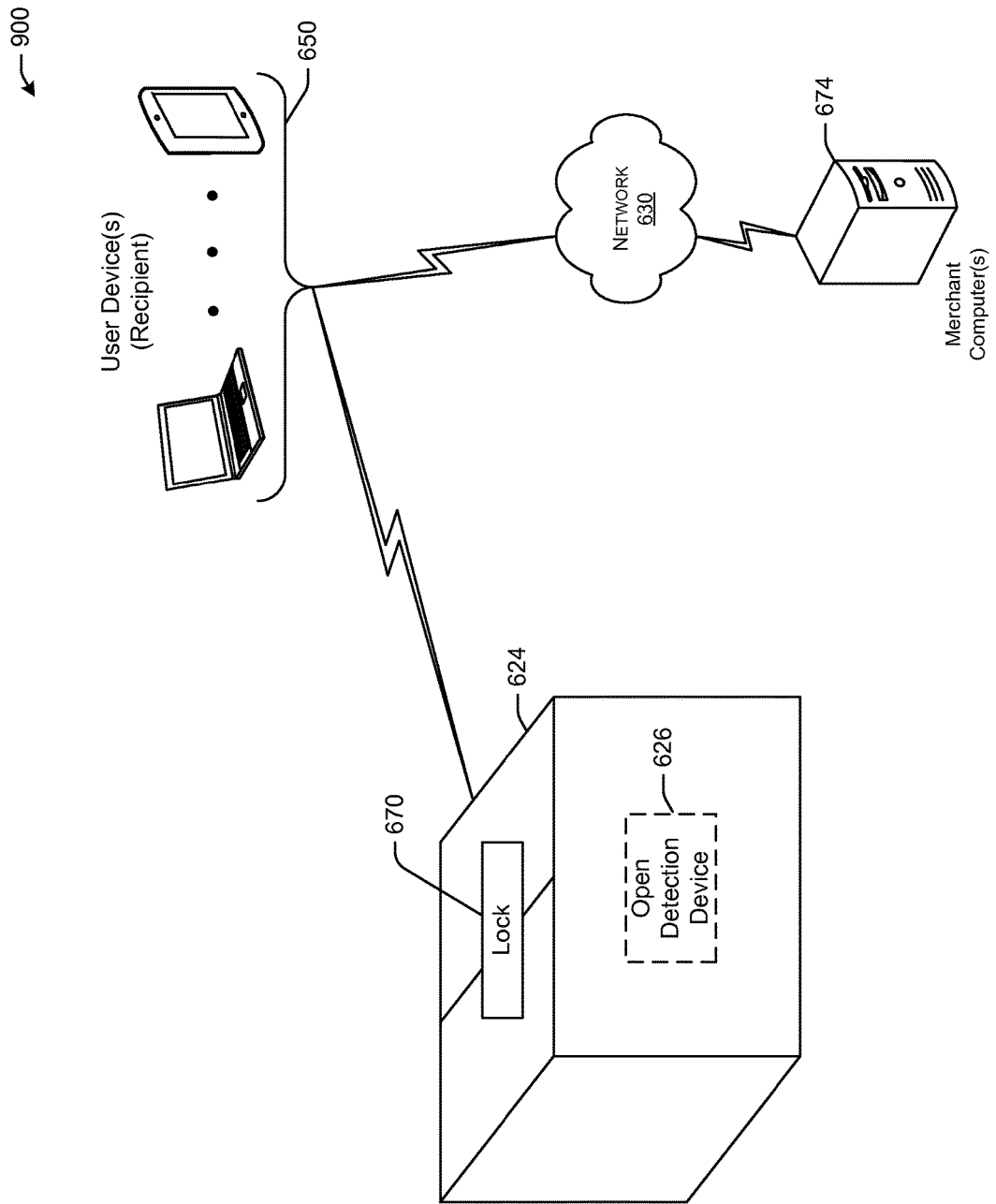
FIG. 6 illustrates an example package with an indicator providing an indication of when the package is enabled to be opened, in accordance with an embodiment of the disclosure.

FIG. 6 provides an example embodiment in which a package 624 may be prevented from being opened until the recipient receives a token, code, or key that can be communicated to a locking mechanism 670 associated with the package 624. The token, code, or key may be sent to the recipient at a preset time, or alternatively, the token, code, or key may be sent at the direction of the sender/purchaser. For example, a package 624 may be delivered to a recipient, and the package 624 may include a locking mechanism 670 that prevents the package 624 from readily being opened. In an illustrative embodiment, a smart phone, tablet computer, laptop computer, portable gaming device or any other suitable user device 650 associated with the recipient at the destination address may receive the token, code, or key from the server computer(s) 674 over network 630, which server computer(s) may be associated with the shipper and/or the entity that initiated the shipping, such as a merchant. The user device 650 may include an application stored in its memory that is operable to receive the token, code, or key, process and/or store the token, code, or key, and then transmit the token code or key, or a representation thereof (e.g., an unlocking signal), to the locking mechanism 670 or an open detection device 626 associated with the package 624. Such transmission may take place, for instance, by wireless communications such as via near field communication, Bluetooth, Wifi, Wifi Direct, etc. In other embodiments, the recipient may enter the code via a user interface associated with the locking mechanism 670.

Upon receipt of the unlocking signal (e.g., the token code or key) from the user device 650, the locking mechanism 670 may unlock the package 624 so that it may be opened. This may trigger the communication of a notification to the sender or purchaser that the package has been unlocked. This communication may be initiated by the open detection device 626 or the server computer 674, and may include information about the unlocking, such as the time the package was unlocked.

As in embodiments described above, the unlocking and/or opening of a package may result in the open detection device communicating a signal indicative of such. Such signal may be sent to the shipping entity, merchant, sender/purchaser, etc.

Figure 7:
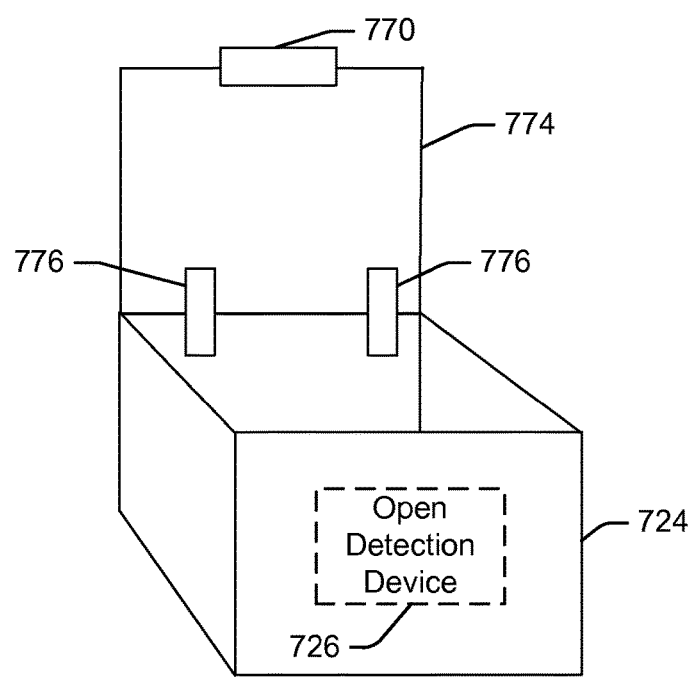
FIG. 7 illustrates an example implementation of a system for preventing a package from being opened until a preset time and transmitting the time of opening, in accordance with an embodiment of the disclosure.

FIG. 7 provides an example embodiment of a package 724 with a locking mechanism 770 and a package opening device 776, such as springs. The locking mechanism 770 may prevent the package 724 from being readily opened, as discussed above. However, once the locking mechanism 770 is unlocked, the package opening device 776 automatically opens the package 724, such as by moving the lid 774. In certain embodiments, the package opening device 776 may include compressed springs that apply pressure to the lid 774 of the package 724. Upon the locking mechanism 770 becoming unlocked, the compressed springs stored mechanical energy forces the lid 774 to automatically open. Those skilled in the art will recognize that various mechanisms and methods can be utilized to implement the package opening device 776 for automatically opening the package 724. In certain embodiments, the package opening device 776 may be in communication with an open detection device 726 associated with the package 724 for controlling or powering the package opening device 776.

Figure 8:
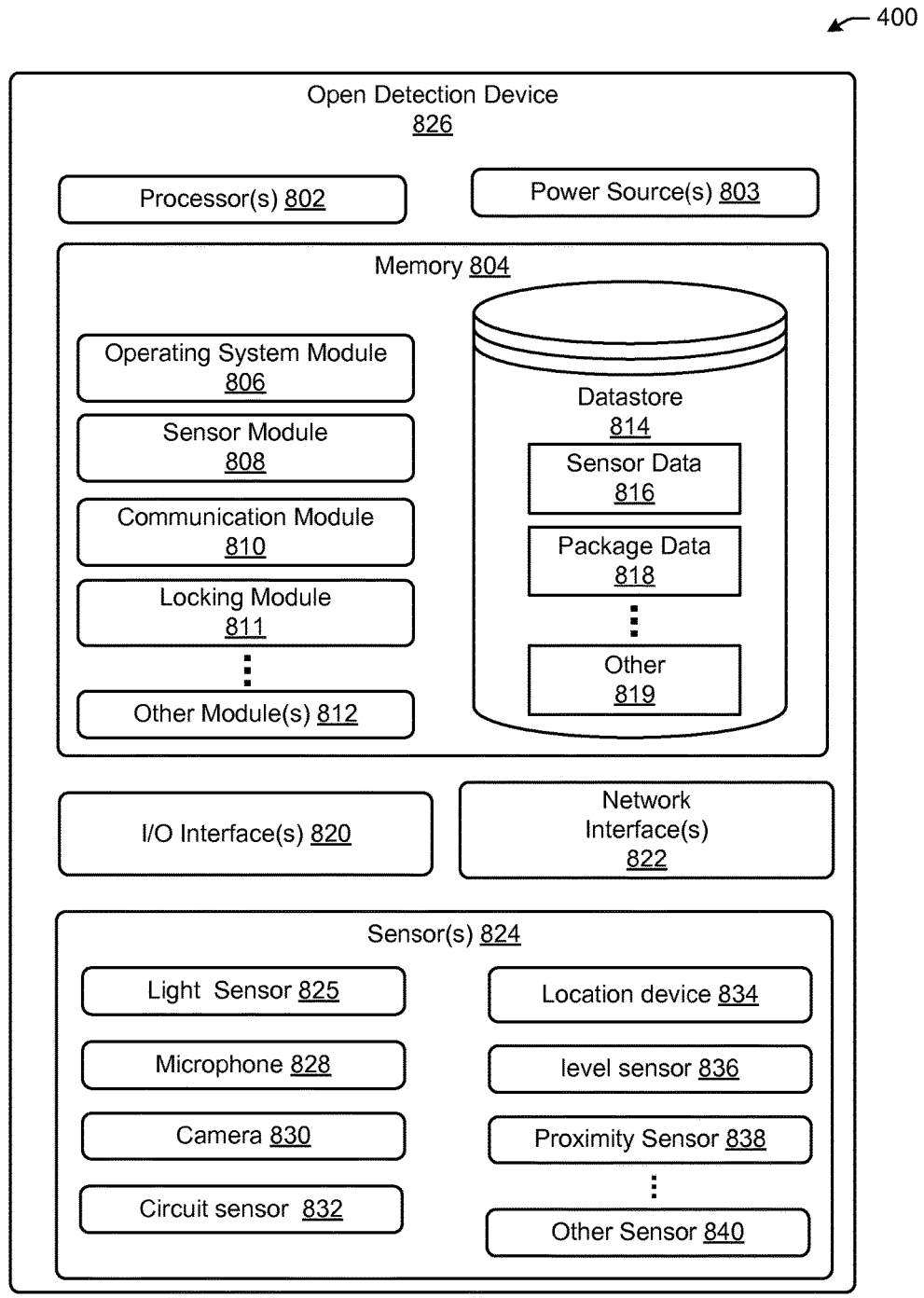
FIG. 8 illustrates an example package with an automatic package opening device, in accordance with an embodiment of the disclosure.

FIG. 8 provides an example embodiment of an open detection device 826, also referred to as a detector device, including one or more sensors, a power source and at least a transceiver. The open detection device 826 may comprise one or more processors 802, one or more power sources 803, one or more memories 804, one or more input/output ("I/O") interfaces 820, one or more sensors 824, and one or more network interfaces 822. The open detection device 826 may include other devices not depicted.

The processor 802 may comprise one or more cores, and may be configured to access and execute at least in part instructions stored in the one or more memories 804. The one or more memories 804 comprise one or more computer-readable storage media ("CRSM"). The one or more memories 804 may include, but are not limited to, random access memory ("RAM"), flash RAM, magnetic media, optical media, and so forth. The one or more memories 804 may be volatile in that information is retained while providing power or non-volatile in that information is retained without providing power. The one or more power sources 803 may include one or more batteries. Alternatively, power source 803 may include one or more photoelectric cells, which in certain embodiments may charge a battery.

The one or more I/O interfaces 820 may also be provided in open detection device 826. These I/O interfaces 820 allow for coupling to devices such as sensors, speakers, transceivers, external memories, and so forth for the open detection device 826.

The one or more network interfaces 822 may provide for the transfer of data between the sensor 824 and another device directly such as in a peer-to-peer fashion, via a network, or both. The network interfaces 822 may include, but are not limited to, personal area networks ("PANs"), wired local area networks ("LANs"), wireless local area networks ("WLANs"), wireless wide area networks ("WWANs"), and so forth. The network interfaces 822 may utilize acoustic, radio frequency, optical, or other signals to exchange data between the open detection device 824 and another device such as a smart phone, an access point, a host computer and the like.

The open detection device 826 may include one or more sensors 824. These sensors may be utilized to detect the opening of the package, collect content data at the time the package is opened, detect removal of additional items or packages disposed inside the package, etc. The sensor may include one or more of the following: light sensors 825, microphones 828, cameras 830, circuit sensors 832, location devices 834, level sensors 836, proximity sensors 838, and other sensors 840.

The one or more light sensors 825 may collect data about ambient light levels in the environment of the open detection system 824, such as inside a shipping package. The sensor module 808 may require a certain quantity of photons to impact the light sensor 825 before initiating an open signal, as discussed in more detail below. Otherwise a small hole or slit in the package may inadvertently initiate the communication of an open package signal. In addition, the light sensor 825 may not be activated until a preset time or event.

The one or more microphones 828 may be configured to acquire sound information. For example, the one or more microphones may acquire the sound of a recipient's excited voice upon opening a shipping package. Data collected by the one or more microphones 828 may be stored in datastore 814, as discussed below.

The one or more image sensors, or cameras, 830 may be configured to acquire visual information in the form of photos or video. For example, the one or more cameras may acquire photos and/or video of a user's excitement when opening a shipping package. Data collected by the one or more cameras 830 may be stored in datastore 814, as discussed below.

The one or more circuit sensors 832 may provide detection of the breaking of an electric circuit. For example, when a box cover is opened, the opening may break a thin wire associated with a closed circuit. Breaking the closed circuit creates an open circuit that the sensor module 808 may use to determine that a package has been opened. In another example, the circuit sensor 832 may be used in connection with a lock mechanism for determining when the lock mechanism has been unlocked.

The one or more location devices 834, such as global positioning device or other navigation or positional device, may provide information such as a location of the open detection device 826. This location information may be geographic location (or "geolocation") data such as a particular set of coordinates on the surface of the Earth for locating the current location of a package or tracking prior locations in transit. Data collected by the one or more location devices 834 may be stored in datastore 814, as discussed below.

The one or more level sensors 836 may be used to provide orientation of a cover of a package relative to the Earth. For example, the level sensors 836 may be configured to detect the angle of the cover in relationship to the sides. If the cover is determined by the sensor module 808 to be significantly greater than an approximately 90 degrees difference from a side for a period of time, the sensor module may determine that the package has been opened.

The one or more proximity sensors 838 may provide an indication as to whether the open detection device 826 is proximate to another device. For example, the proximity sensors 838 may detect the loss of a radio frequency identification (RFID) tag placed on an item that may be shipped within the shipping package. The loss of detection of the RFID tag may indicate that the shipping package has been opened and the item to which the RFID is associated has been removed from the shipping package.

Other sensors 840 may be present in or associated with the open detection device 826. For example, the other sensors 840 may comprise near-field communication devices, and so forth. The data collected by the sensors 824 may be stored by datastore 814 as sensor data 816.

The one or more memories 804 may store instructions or modules for execution by the processor 802 to perform certain actions or functions. The following modules are included by way of illustration, and not as a limitation. Furthermore, while the modules are depicted as stored in the memory 804, in some implementations, these modules may be stored at least in part in external memory which is accessible to the open detection device 826 via the network interfaces 822 or the I/O interfaces 820. These modules may include an operating system module 806 configured to manage hardware resources such as the I/O interfaces 820 and sensors 824, and provide various services to applications or modules executing on the processor 802.

The one or more memories 804 may also store a datastore 814. The datastore 814 may comprise one or more databases, files, linked lists, or other data structures. The datastore 814 may be configured to store at least a portion of sensor data 816, package data 818 (e.g., package identification information, sender/purchaser information, recipient information, destination address information item information, delivery information, etc.), or other data 819.

A sensor module 808 may be stored in the memory 804. The sensor module 808 may be configured to control the operation of various components of the open detection device 826, such as the communications module 810, locking module 811, and sensors 824. In certain embodiments, this may include the collection of data from the sensors 824 and the storage thereof in the datastore 814. Based on the collected data from the sensors 824, the sensor module 808 may determine if the package has been opened, and if so, take certain action in response thereto. For example, the sensor module 808 may initiate the communication of an open package signal to a shipping entity or merchant, which signal may include at least some of the package data 818 (e.g., the package identification) and a time stamp of when the package was detected as opened. In some embodiments the sensor module 808 may also communicate contextual data that was collected by one or more sensors 824 in response to the determination that the package has been opened.

The determinations made by the sensor module 808 may be based on the application of rules, which may be stored as other data 819 in the datastore 814. For example, the sensor module 808 may monitor at least certain aspects of the sensor data 816, and in doing so, may apply one or more rules to identify, for example, when a package is opened, when a package is unlocked, when a package has automatically opened, etc. Different rules may be applied to the data from different sensors, as may be desired. For example, to trigger an indication that a package has been opened, the amount of the ambient light detected by the light sensor 825 may be required to exceed a certain value, or perhaps, a certain value for at least a certain period of time. Otherwise a small change in light detected by the light sensor 825 may have just been caused by a small hole in the package. As another example, the sensor module 808 may be configured to poll an electric circuit associated with the circuit sensor 832 to determine if the circuit has been broken by the opening of the cover to the shipping package. In yet another example, the sensor module 808 may be configured to determine the relative angles of the cover of a package to its sides. A relative angle of significantly greater the 90 degrees may indicate that the package has been opened. In yet another example, the sensor module 808 may be configured to poll via the proximity sensor 838 for the detection of an RFID tag on an item shipped within the shipping package. Loss of detection of the RFID tag may indicate that the package has been opened and the item removed from the shipping container.

In certain embodiments, upon the determination by the sensor module 808 that the package has been opened, the sensor module 808 may interact with other sensors 824 to, for example, collect contextual data associated with the opening of the package. For example, the sensor module 808 may cause the camera or microphone to record sensor data 816, such as photos and/or sound recordings of the recipient opening the package and/or immediately thereafter. In another example, the sensor module 808 may collect location information from the location device 834. The sensor module 808 may also interact with the communication module 810 to cause the retrieval of certain sensor data 816, such as that from the camera 830, microphone 828, or location device 834, and then transmit or communicate such data via network interface 822 to, for example, a shipper entity or merchant, as may be desired. The communication module 810 may format the data for more efficient and secure transmission.

A locking module 811 may be provided to control the operation of a lock mechanism, an unlock indicator, and/or a package opening device. For instance, the locking mechanism, which may be in communication with and/or under the control of the sensor module 808, may monitor a lock mechanism associated with a package to notify the sensor module 808 when the lock mechanism is to be unlocked, such as a preset time, which may be stored in the package data 818. In some embodiments, the locking module 811 may be configured to automatically open the package at a preset time, which time may be stored as package data 818. In other embodiments, an unlock indicator, which may be associated with the lock mechanism, may be controlled by the locking module 811 for changing an indicator associated with the package to reflect the status of the lock (e.g., locked or unlocked) and/or to provide information via a display, such as the time remaining until the package is unlocked.

The locking module 811 may also be configured to receive from the communication module 810 a token, code, or key from an external device, such as a user device of the recipient. For example, at or about the time at which the package may be opened, the recipient may receive a communication via their user device that includes a token, code or key that may be utilized to open the package, that is, the locking mechanism associated with the package. While a code may be entered into a user interface provided by the open detection device 826, a token or key may be wirelessly communicated to the open detection device 826, where the locking module 811 may process the token or key and unlock the package if verified or authenticated, such as with use of a matching or paired token or key stored as package data 818.

Those skilled in the art will recognize that other modules 812 may be present and other devices may be utilized to perform the function of detecting the opening of a package, collecting contextual information associated with the opening, and transmitting the detection information. In addition the modules described may be combined with one another and/or the functions described may be performed by modules other than as described.

Figure 9:
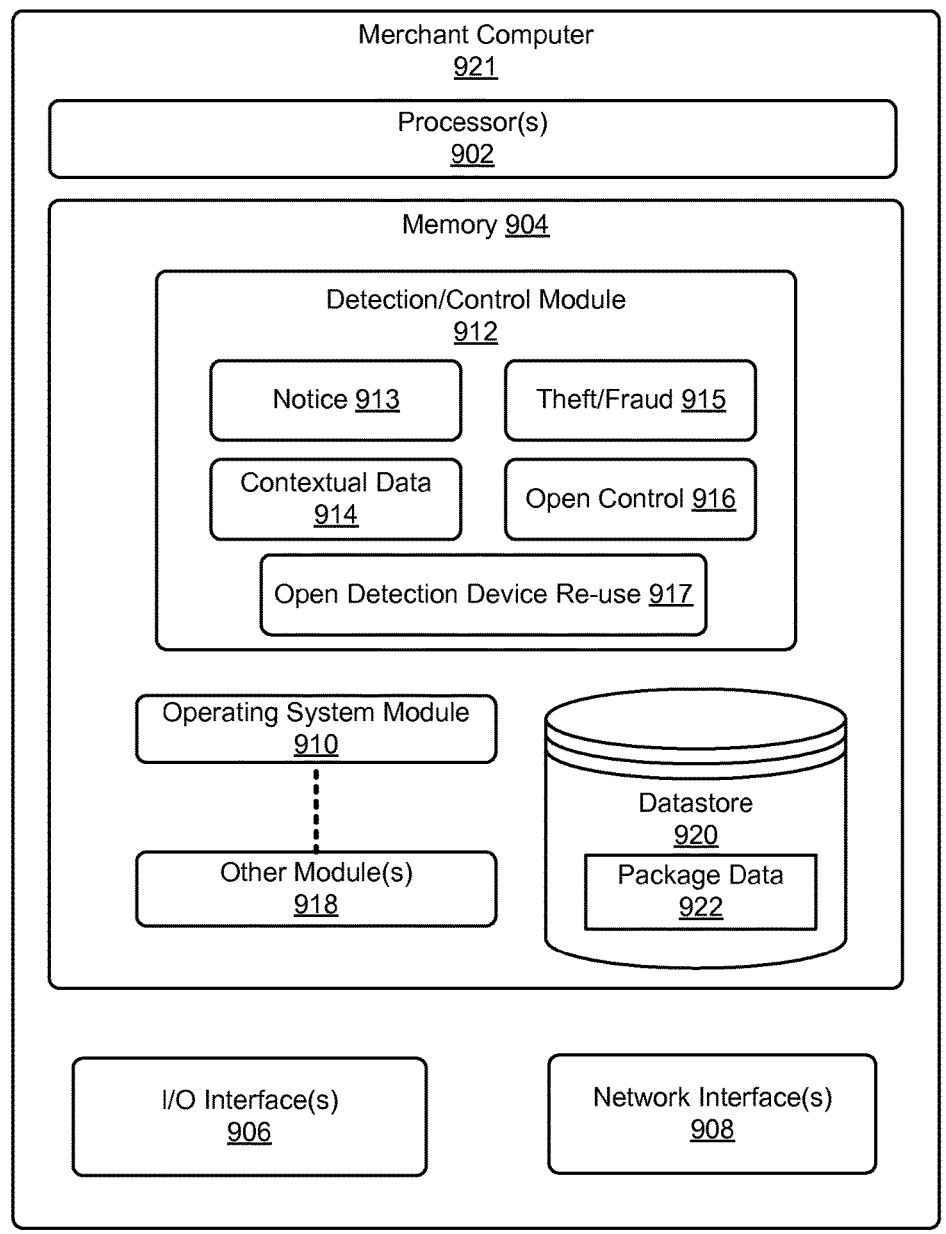
FIG. 9 illustrates an example block diagram of a server configured to perform actions upon shipping a package with an open detection device, in accordance with an embodiment of the disclosure.

FIG. 9 provides an example embodiment of a merchant computer 921 for managing the detection and control of the opening of a package. For example, the merchant computer 921 may store certain package data 922 or information prior to a package being picked up for shipping, and may perform certain actions upon receipt of a package open signal or the like from an open detection device or at various other points in the process between preparing the package for shipment to the opening of the package and/or thereafter. Example actions may include notifying the sender that the package has been opened, notifying a recipient that a delivered package has not been opened, processing a returned package/open detection device for re-use, communicating a token, code or key to a sender or recipient for unlocking a package, and delivering or providing access to the sender to contextual data collected by the open detection device.

In the illustrative embodiment the merchant computer 921 is associated with a merchant or retailer that ships a product to an individual or business. However, in other embodiments, the merchant computer 921 may be associated with a shipping entity. The merchant computer 921 may comprise one or more processors 902, one or more memories 904, one or more input/output ("I/O") interfaces 906, and one or more network interfaces 908. The merchant computer 921 may include other components and devices not depicted.

The processor 902 may comprise one or more cores and is configured to access and execute at least in part instructions stored in the one or more memories 904. The one or more memories 904 comprise one or more computer-readable storage media ("CRSM"). The one or more memories 904 may include, but are not limited to, random access memory ("RAM"), flash RAM, magnetic media, optical media, and so forth. The one or more memories 904 may be volatile in that information is retained while providing power or non-volatile in that information is retained without providing power.

The one or more I/O interfaces 906 may also be provided with the merchant computer 921. These I/O interfaces 906 allow for coupling devices such as keyboards, mice, speakers, sensors, displays, and the like.

The one or more network interfaces 908 may provide for the transfer of data between the merchant computer 921 and another device directly such as in a peer-to-peer fashion, via a network, or both. The network interfaces 908 may include, but are not limited to, personal area networks ("PANs"), wired local area networks ("LANs"), wireless local area networks ("WLANs"), wired wide area networks ("WANs"), wireless wide area networks ("WWANs"), and so forth. The network interfaces 908 may utilize acoustic, radio frequency, optical, or other signals to exchange data between the merchant computer 921 and another device such as other servers, access points, personal computers, smart devices and the like.

The one or more memories 904 may store instructions or modules for execution by the processor 902 to perform certain actions or functions. The following modules are included by way of illustration, and not as a limitation. Furthermore, while the modules are depicted as stored in the memory 904, in some implementations, these modules may be stored at least in part in external memory which is accessible to the merchant computer 921 via the network interfaces 908 or the I/O interfaces 906. These modules may include an operating system module 910 configured to manage hardware resources such as the I/O interfaces 906 and provide various services to applications or modules executing on the processor 902.

The one or more memories 904 may also store a datastore 920. The datastore 920 may comprise one or more databases, files, linked lists, or other data structures. The datastore 920 may be configured to store at least a portion of package data 922. Package data 922 may include package identification, sender information, recipient information/destination address, content information, shipper information, expected delivery time, shipping route information, contextual information collected from sensors, and the like.

A detection/control module 912 may be stored in the memory 904. The detection/control module 912 may include software for managing notices, contextual data, fraud/theft, package open control and open detection device re-use. For example, a notice engine 913 may receive and process package open signals, process notifications associated with delivered but not opened packages, etc. The notice engine 913 may be configured to routinely poll records associated with packages that have been shipped, wherein such records may be stored as a part of package data 922 within the datastore 920. If a record associated with a package does not indicate that an open package signal has been received for that package, then the notice engine 913 may determine if the package has been delivered. The notice engine 913 may obtain delivery data from the shipper, which data may be stored in connection with the package in package data 922. If the package has not been delivered within a set period of time, such as a few weeks, the notice engine 913 may generate and transmit a notification to the shipper and/or to the sender.

If the package has been delivered and a set period of time has lapsed, such as a few days, without receipt of an open package signal from the open detection device associated with the package, then the notice engine 913 may generate and cause to be transmitted a reminder notification to the recipient. Multiple notifications may be transmitted after the lapse of associated predetermined time periods without receipt of an open package signal. After a significant amount of time has lapsed after the delivery of the item, the notice engine 913 may cause the record to be archived and no longer polled.

The notice engine 913 may take various actions upon receipt of an open package signal or an item removed signal. For example, the notice engine 913 may be configured to generate an e-mail to the sender of the package informing them that the recipient has opened the package and/or removed the item from the package. The notice engine may send other forms of notification, such as a text message, automated voice message, etc., as may be requested by the sender. Such information may be stored in datastore 920 in a user profile record for the sender and/or as part of the package data 922. In the illustrative embodiment, an e-mail notification message sent to the sender in response to an open package signal may include contextual data such as video, audio recordings, time of opening, location of opening, etc., received in connection with the package opening and stored in package data 922, as discussed below.

The notice engine 913 may be configured to update the package data 922 upon detecting receipt of a signal from the open detection device, such as an open package signal or item removed signal. Package identification data contained within the signal enables the notice engine 913 to identify and update the appropriate package records in the package data 922 with information contained within the signal.

The contextual data engine 914 may coordinate with the notice engine 913 to provide senders with contextual data received from the open detection device. The contextual data engine 914 may format and deliver the contextual data associated with the opening of a package for delivery to the user device of the sender (or recipient) for play back, or it might host such contextual data for downloading to a user device of the sender (or recipient), such as with a hyperlink included in the notice sent by the notice engine 913. The open package signal may include the time associated with the opening of the package and collected contextual data such as audio, video, or GPS information at the time of the opening, any and all of which may be sent to or provided to the sender (or recipient).

A fraud/theft engine 915 may provide for the management of possible fraud or theft identified in association with the opening or unlocking of a package. For instance, the fraud/theft engine may access data associated with the opening of a package and determine that the opening is associated with an act of fraud or theft. This determination may be based on historical data relating to fraud and theft, which may be utilized to determine the likelihood the opening of the package is either fraud or theft. Additional data associated with the package that may be considered includes shipping information such as expected delivery date, actual delivery date, delivery confirmation, shipping route and checkpoints, contents of package (e.g., estimated value), sender or merchant information, etc.

In an illustrative example, the fraud/theft engine 915 may compare the time of opening with shipping information, such as the delivery time. If the delivery has not been completed and an open package signal has been received, then the fraud/theft engine 915 may determine that the opening is likely associated with either fraud or theft and may generate a theft or fraud alert. If location information contained within the open package signal is not the same location as the delivery address, then the fraud/theft engine 915 may determine that the opening is likely associated with either fraud or theft and may generate a notification to a fraud department associated with the merchant or to the recipient about the discrepancy.

Other actions that may be taken by the fraud/theft engine 915 may include notifying a fraud department associated with the merchant, notifying government authorities, notifying the shipper, notifying the sender, notifying the recipient, creating a report or record, initiating a fraud/theft incident protocol for mitigating any loss and preventing future fraud or theft, or generating a new replacement order and/or initiate the shipping of a replacement item to the recipient on a priority basis.

An open control engine 916 may provide and manage tokens, codes and keys for use in locking and unlocking locking mechanisms on packages. The open control engine 916 may generate a token, code and key as a package with a locking mechanism is prepared for shipping. The open control engine may distribute the token, code or key to the sender or recipient at a designated time or in response to a designated event, such as a request from the sender. For example, a sender may request the token, code or key needed to unlock a lock mechanism on a package sent on behalf of the sender be delivered to the recipient at a designated time. The method of delivery may also be designated, such as by the sender or recipient, and may include e-mail, text messaging, automated voice messaging, etc.

Once a package has been opened and/or a lock mechanism unlocked, the recipient may be prompted or incentivized to return the package, the open detection device, and/or the lock mechanism for re-use. For example, a recipient may be awarded a coupon or discount for returning the package, which may be configured to be collapsed and mailed or shipped back to the shipper or merchant. The open detection device re-use engine 917 may process such returned devices and mechanisms for re-use by tracking identification numbers, lock codes (or tokens/keys), managing inventory of same, etc. In addition, the open detection device re-use engine 917 may determine the incentive type (e.g., coupon, discount, free download, etc.) and value to provide each individual recipient to encourage return of the package, open detection device and/or lock mechanism based on information known about the recipient, such as buying and browsing historical data, information relating to the shipped item, etc. Such incentives may be included in the package or sent separately to the recipient, such as by e-mail, text messaging or any other suitable means. If the recipient is not responsive to an initial incentive, then the open detection device re-use engine 917 may provide subsequent incentives of different value or of different types.

Other modules 918 may be configured to perform additional actions.

Those skilled in the art will recognize that other modules 918 may be configured and other devices may be utilized to perform the function of detection of the opening of a package, collecting local information associated with the opening, transmitting the detection information and performing actions based upon the receipt of a signal indicating the opening of a package.

Figure 10:
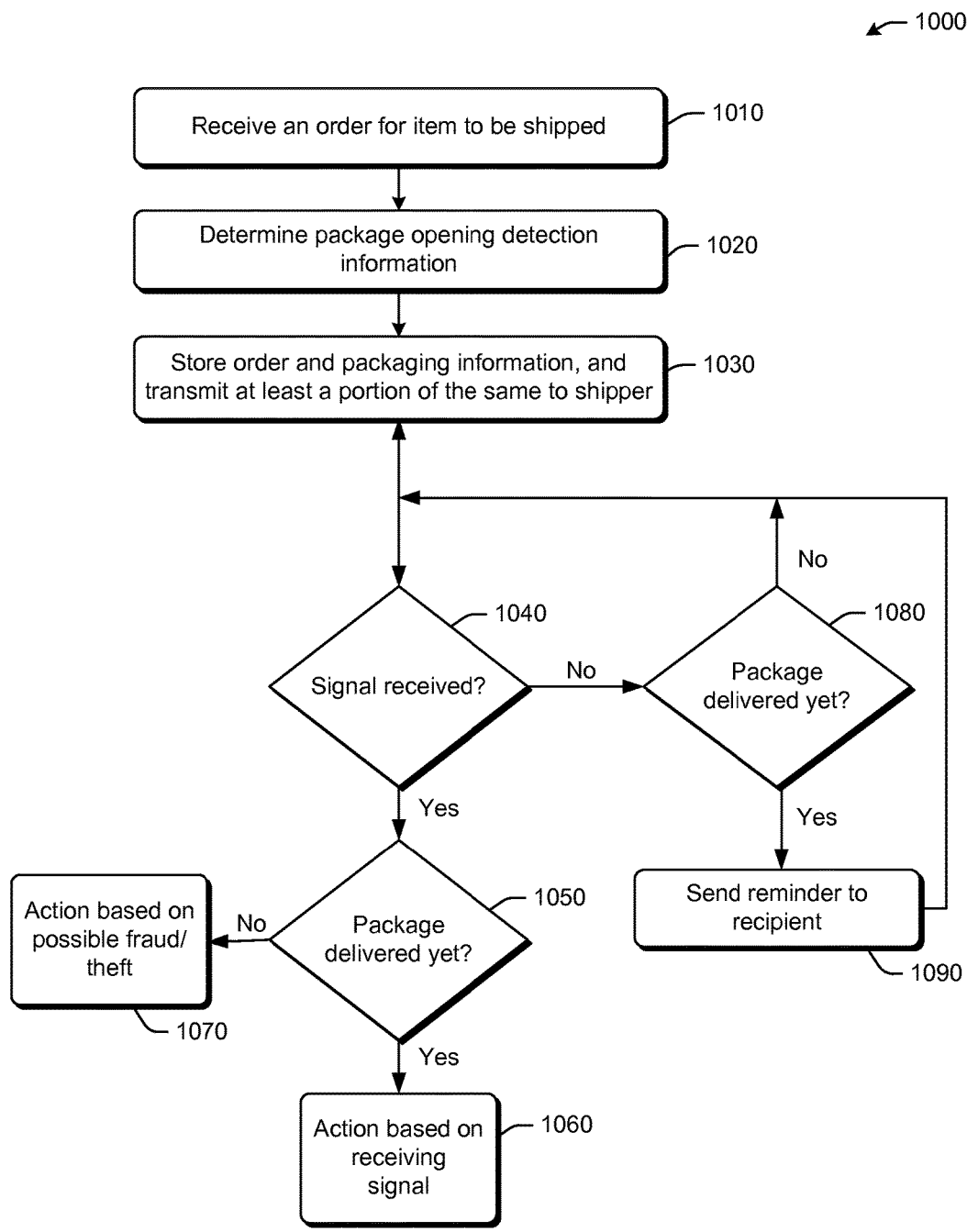
FIG. 10 illustrates an example flow diagram of steps performed by a web server processing detection of opening a package, in accordance with an embodiment of the disclosure.

FIG. 10 illustrates an example flow diagram 1000 of steps performed by a merchant computer processing detection of the opening of a package in accordance with an embodiment of the disclosure. While presented in the context of a merchant, such operation and functionality described herein may also be performed by a shipper or other entity associated with the shipment of goods or the provisioning of services that involve shipping packages.

At step 1010, a merchant receives an order for an item to be shipped. The merchant may receive the order from an online customer, retail store, vendor or supplier, from a web server that performed the intake, from a human operator that takes the order, or any other source or method to obtain order information. The order information typically includes at least the destination address of the intended recipient.

At step 1020, the merchant determines packaging information. An order may specify that a purchaser (also referred to as the sender) desires notification of when the package is actually opened. Alternatively, the merchant may have programmed logic indicating a package should have package open detection capabilities based upon various parameters such as desirability for fraud or theft detection or up-sell opportunities. Other information that might be determined are the identification of the open detection device applied to the package, the identification of the locking mechanism to be applied to the package, purchaser information (such as certain delivery and notice preferences), item information, etc.

At step 1030, at least some of the order and packaging information may be transmitted to a shipper for shipment. The packaging information may specify that an open detection device is to be placed within the shipping container, if not already included with the package. The packaging information may specify that a specially designed shipping container is to be used. Such a container may be designed in a way as to be easily folded and returned to the shipper. Alternatively, the packaging information may specify that the open detection system is to be easily removed from the package for returning to the shipper.

At this point the package is shipped to the destination address for receipt by the intended recipient. As necessary, other actions may be taken by the merchant, such as sending to the recipient or purchaser (for subsequent delivery to the recipient) an unlock token, code or key.

At decision step 1040, it is determined if a signal has been received in connection with the package. For example, the signal may indicate that the package has been opened, an item has been removed from the package, or that the package has been unlocked. The signal may be generated by the open detection device and communicated over a network to one or more computers associated with the merchant.

If a signal has been received, at decision step 1050 it is determined whether the package has been delivered, or in some embodiments, whether it was scheduled to be delivered. This may be determined based on an expected delivery date or the actual delivery date, which information may be provided by the shipper to the merchant. If the package has been delivered, then action may be taken in response thereto. For example, the merchant may send notification to the purchaser, close the order, send to the sender and/or recipient follow-up incentives or offers relating to the item and/or to the sender or recipient. The notification may include locally collected contextual data recorded at the time of the opening, such as audio or video of the recipient's reaction upon seeing the item. Additionally, the merchant may provide consumer modeling profile information in connection with any data collected to another business unit. In addition, merchant may send a notice or create a new order to send another similar or related item, such as a prescription refill or other consumable product, after a certain time lapse. In addition, the merchant may send a message to any other interested party.

If the package has not been delivered, and was not supposed to have been delivered, as of the time the signal was received, then at step 1070 certain fraud/theft prevention and mitigation action may be taken by the merchant. In another embodiment, regardless of whether the package has been delivered or not, the location where the package was opened may suggest possible fraud or theft. Such location information may be captured by the open detection device and included in the signal.

If at decision step 1040 it is determined that a signal has not been received, then at decision step 1080 it is determined if the package has been delivered yet. If not, then the process goes back to step 1040. If the package has been delivered, or was supposed to have been delivered, then at step 1090 the merchant may send the recipient a reminder that the package was delivered but has not been opened and/or unlocked. In some embodiments, a reminder may not be sent until a predetermined period of time following delivery. Multiple notifications may be transmitted after the lapse of associated predetermined time periods.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by processor-executable program instructions. Likewise, some blocks of the block diagrams and flow diagrams may not necessarily need to be performed in the order presented, or may not necessarily need to be performed at all, according to some implementations.

These processor-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. One or more non-transitory computer-readable media storing computer-executable instructions that, when executed by at least one processor, configure the at least one processor to perform operations comprising:
    receiving order information associated with an order for an item purchased by a purchaser and shipped to a recipient;
    determining, based at least in part on the order information, a package associated with shipment of at least the item, the package including a detector device configured to detect opening of the package based on a first sensor signal from one or more sensors and, in response to the detection, transmit a second signal;
    receiving an indication that the package has been accepted for delivery by a shipper;
    associating the detector device or the package with the order;
    receiving, over a first wireless network, the second signal from the detector device, the second signal including location data indicating a location of the package and comprising at least audio data and video data associated with an opening of the package;
    determining an open package time for the opening of the package;
    determining an expected delivery time of the package;
    determining that the opening of the package is associated with potential fraud or theft based at least in part on a comparison of the open package time and the expected delivery time; and
    in response to the determining that the opening of the package is associated with potential fraud or theft, sending to a user device associated with the purchaser, over a second wireless network and based at least in part on the second signal, a notification of the opening of the package, wherein the notification comprises a portion of the audio data and a portion of the video data.

2. The non-transitory computer-readable media of claim 1, wherein the second signal is transmitted based at least in part on ambient light conditions inside the package, wherein the ambient light conditions are detected by the detector device.

3. The non-transitory computer-readable media of claim 1, the operations further comprising receiving shipping information from the shipper relating to shipment of the package.

4. The non-transitory computer-readable media of claim 1, wherein the audio data or the video data is data recorded by the detector device in connection with detection of the opening of the package.

5. The non-transitory computer-readable media of claim 1, the operations further comprising sending to the shipper a message providing notice of the opening of the package.

6. The non-transitory computer-readable media of claim 1, wherein the second signal includes an indication of the opening of the package, and at least an identifier associated with at least one of the package or the detector device.

7. A method, comprising:
   receiving, by a computer system including one or more processors, data associated with a package;
   receiving shipping data associated with delivery of the package, wherein the shipping data includes an expected time of package delivery to a final destination address associated with a package recipient;
   receiving, by the computer system over a first wireless network, a second signal from a detector device associated with the package, the second signal indicating a time that the package has been at least partially opened based on a first sensor signal from one or more sensors and including audio data and video data associated with the at least partial opening of the package;
   determining, by the computer system, that the at least partial opening of the package is associated with fraud or theft based on the second signal, wherein the determination of fraud or theft includes a comparison of the expected time of the package delivery to the final destination address and the time that the package is at least partially opened; and
   in response to the determining that the at least partial opening of the package is associated with fraud or theft, sending, over a second wireless network and based at least in part on the second signal, a notification of the at least partial opening of the package, wherein the notification comprises a portion of the audio data and the video data.

8. The method of claim 7, further including sending a message associated with the determined fraud or theft to at least one of a sender of the package or an intended recipient of the package.

9. The method of claim 7, wherein the package includes a locking mechanism that is in communication with the detector device and is set to unlock the package at a predetermined time, wherein the locking mechanism includes a display for indicating a status of the locking mechanism.

10. The method of claim 9, wherein the locking mechanism displays a time remaining until the package is unlocked.

11. A method, comprising:
    receiving, by a computer system including one or more processors, package data associated with a package;
    receiving, by the computer system over a first wireless network, a second signal from a detector device associated with the package, the second signal indicating at least a first time associated with at least a partial opening of the package;
    receiving shipping data associated with delivery of the package, the shipping data including a second time of an expected time of package delivery to a final destination address associated with a package recipient;
    determining, by the computer system, that the at least partially opened package is associated with potential fraud or theft by comparing the at least the first time and the second time; and
    in response to the determining that the at least partially opened package is associated with potential fraud or theft, sending, by the computer system over a second wireless network, to a user device associated with a sender that is associated with the package, at least in part based on receiving the second signal, a notification that the package has been at least partially opened based on a first sensor signal from one or more sensors, the notification including audio data and video data associated with the at least partial opening of the package.

12. The method of claim 11, wherein the second signal comprises at least one of video data, image data, or audio data captured in connection with the at least partial opening of the package.

13. The method of claim 11, wherein the package includes a locking mechanism to lock the package closed, the method further comprising sending at least one of a token, code, or key to a sender or recipient associated with the package, wherein the at least one of the token, code, or key is configured to unlock the locking mechanism.

14. The method of claim 11, further comprising sending a message to a shipper associated with the package, the message indicating that the package has been at least partially opened.

15. The non-transitory computer-readable media of claim 1, wherein the first wireless network is the second wireless network.

16. The method of claim 7, wherein the first wireless network is the second wireless network.

17. The method of claim 11, wherein the first wireless network is the second wireless network.

* * * * *